United States Patent [19]

Igarashi et al.

[11] 3,755,043

[45] Aug. 28, 1973

[54] ELECTRET HAVING IMPROVED STABILITY

[75] Inventors: Yuriko Igarashi; Haruko Kakutani, both of Tokyo; Masayasu Suzuki, Fukushima; Makoto Fukuda, Fukushima; Takao Abe, Fukushima, all of Japan

[73] Assignee: Kureha Kagaku Kogyo Kabushiki Kaisha, Tokyo, Japan

[22] Filed: Sept. 10, 1970

[21] Appl. No.: 71,167

[30] Foreign Application Priority Data

Nov. 14, 1969 Japan .............................. 44/90757

Sept. 10, 1969 Japan .............................. 44/71254

[52] U.S. Cl. ............ 156/272, 161/183, 179/111 E, 307/88 ET

[51] Int. Cl. .......................................... B29c 19/02

[58] Field of Search ............ 117/161 UF; 156/272; 307/88 ET; 179/111 E; 161/183

[56] References Cited

UNITED STATES PATENTS

| | | | |
|---|---|---|---|
| 3,612,778 | 10/1971 | Murphy et al. | 307/88 X |
| 3,154,428 | 10/1964 | Cochrane | 117/161 X |
| 3,390,104 | 6/1968 | Miller et al. | 117/161 X |
| 3,380,983 | 4/1968 | Siegart | 117/161 X |
| 2,740,184 | 4/1956 | Thomas | 307/88 |
| 3,000,735 | 9/1961 | Gunning et al. | 307/88 |
| 3,458,713 | 7/1969 | Perlman et al. | 179/111 X |

*Primary Examiner*—William D. Martin

*Assistant Examiner*—Bernard Pianalto

*Attorney*—Sughrue, Rothwell, Mion, Zinn and Macpeak

[57] ABSTRACT

In a process for the production of an electret composed of a high molecular weight base material by applying to the base material a high D. C. potential at a high temperature, cooling the material while continuing the application of the potential, and then removing the electric potential, the improvement which comprises covering the opposite surfaces of the base material before polarizing the base material with thin films of a different high molecular weight material having a higher electrical insulating property than that of the base material prior to the application of the electric potential.

5 Claims, 5 Drawing Figures

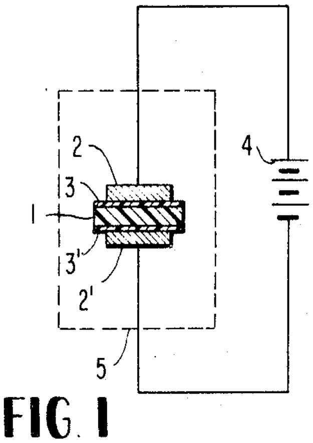
FIG. 1
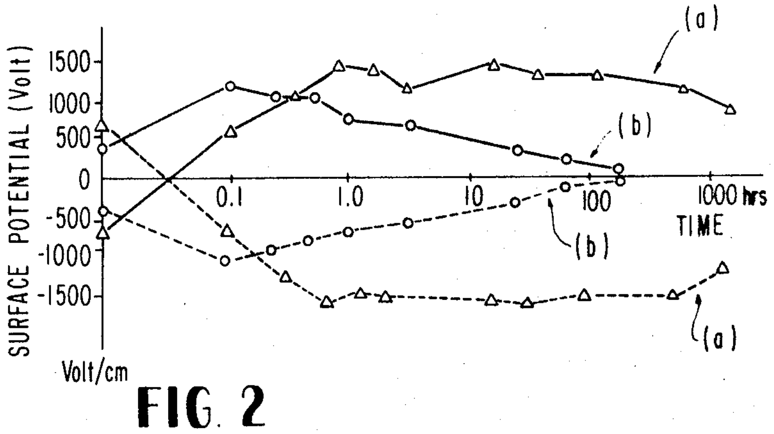
FIG. 2
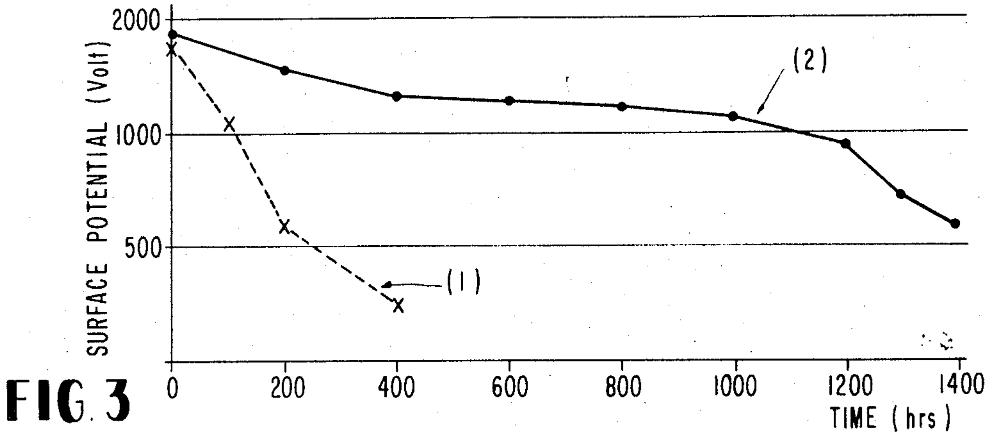
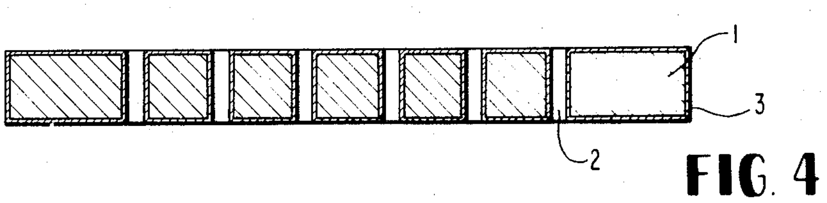
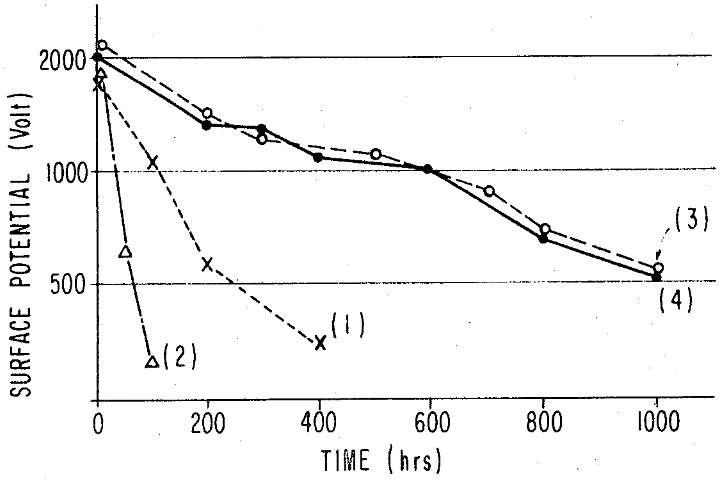
FIG. 5
INVENTORS
YURIKO IGARASHI
HARUKO KAKUTANI
MASAYASU SUZUKI
MAKOTO FUKUDA
TAKAO ABE
BY Sughrue, Rothwell, Mion, Zinn & Macpeak
ATTORNEYS

ELECTRET HAVING IMPROVED STABILITY

BACKGROUND OF THE INVENTION

1. Field of the Invention

The present invention relates to a process for producing a stable electret having better properties than the electrets made from conventional organic materials, particularly synthetic high molecular weight materials, and also, to the improved electret prepared by the described process.

2. Description of the Prior Art

An electret prepared by maintaining, for a long period of time at a proper temperature under a direct current high electric field, a plastic film or sheet consisting of an amorphous high molecular weight material such as polymethyl methacrylate or polystyrene; a crystalline high molecular weight material such as polyethylene terephthalate, polycarbonate, polyfluoroethylene, and polypropylene; a copolymer thereof; or a mixture thereof, and thereafter cooling the film or sheet to room temperature, can maintain its polarized state for a long period of time and is now developing uses in many areas, such as electric sonic transducers for speakers and microphones and other electronic equipment. Among the aforementioned materials, polar high molecular weight materials such as polymethyl methacrylate, polyethylene terephthalate, polycarbonate, and polar fluorine-containing resins have been well known as materials for forming electrets having a comparatively long life.

However, when the electrets produced from these materials are practically utilized for electric sonic transducers or other equipment, they are frequently used under condisderably severe and undesirable conditions as compared with normal storage conditions; for example, under a considerably higher temperature than normal temperature.

Under such severe conditions, the electrets made from the aforesaid materials which are comparatively stable under normal conditions can not always maintain their function as an electret for a long period of time.

Therefore, an object of this invention is to provide a process for producing an electret having improved stability even under the aforesaid severe conditions.

Another object of this invention is to provide such an electret having improved stability and life even under severe conditions.

SUMMARY OF THE INVENTION

Thus, according to the present invention, an improved electret is produced by covering a film or a sheet of conventional high molecular weight material used for an electret with a thin film of a high molecular weight material haiving a high electric insulating property and then subjecting the assembly to a conventional electret-forming treatment. By the procedure of this invention, not only the life of the electret under ordinary storage conditions but also the life thereof under high temperature and high humidity conditions can be remarkably increased. Furthermore, by applying the coating of the high molecular weight material to an electret after the base material is converted into an electret by a conventional method, a similar improvement in the life, as above, can be astonishingly obtained.

BRIEF DESCRIPTION OF THE DRAWINGS

FIG. 1 is a schematic view showing an embodiment of the electret of this invention.

FIG. 2 is a graph showing the rate of decline of the surface potentials of (a) the electret of this invention and (b) an ordinary electret.

FIG. 3 is a graph showing the relation between the variation of the surface potential of an electret over a period of time in hours, in which curve (1) indicates the surface potential of an electret prepared by polarizing without covering the base material of the electret and curve (2) indicates the surface potential of the electret of this invention prepared by polarizing after covering the base material.

FIG. 4 is a schematic cross-sectional view showing an electret prepared by coating, with a material having excellent electrical properties, an electret polarized in a conventional manner, and FIG. 5 is a graph showing the decline of the surface potential (V) at 80° C of an electret which was not covered after polarization and an electret which was covered after polarization.

DETAILED DESCRIPTION OF THE PREFERRED EMBODIMENTS

As the material for the electret base used in this invention, any material which is generally used for electrets and which can be converted into an electret by ionic impurities can be employed. Such materials are, for example, polar high molecular weight materials or non-polar high molecular weight materials; e.g., polypropylene and polyethylene can be used. It is desirable to employ materials having a high softening point or melting point. There are no particular limitations with respect to the thickness of the film or sheet base material, but usually a sheet having a thickness of 50–3,000 microns is preferably used.

The thin film of an insulating high molecular weight material which covers the base material for the electret may be formed by directly applying to the surfaces of the base material a solution of the high molecular weight material in a proper solvent or by applying preformed films of the high molecular weight material to the base material.

The high molecular weight material employed for the thin film is of course different from the high molecular weight material used for the base material and is required to have a higher electric insulating property than the base material. That is, the high molecular weight material used for the thin film preferably has a volume resistivity of higher than $10^{15}\Omega$–cm, preferably higher than $10^{17}\Omega$–cm. The covering material is not always a high molecular weight material which can provide a stable electret by itself. There are also no particular limitations with respect to the thickness of the covering film but usually a thickness of from 8 to 100 microns is desirable.

As practical examples of the material used to cover the base material, there may be illustrated: polymethyl methacrylate, polytetrafluoroethylene, polyethylene terephythalate, polypropylene, and the like. It must be selected, as mentioned above, so that the cover material is different from the base material and has a higher insulating property than the base material.

For making an electret from the laminated assembly thus prepared, the assembly is maintained at a suitable temperature (usually 80°–150° C) which is determined by the particular materials used, for a few hours while applying thereto a direct current high potential in a conventional manner, the assembly is cooled while applying the electric potential, and then the electric potential is removed. Also, the coating of the high molecular weight material may be applied to the electret after the base material is converted into an electret in the aforesaid manner.

The laminated electret prepared by the aforesaid method shows a stability higher than any electrets prepared by similarly treating each of the materials composing the laminated electret under the same conditions as above, from which it will be understood that the advantages of this invention are several.

In FIG. 1, a sheet 1 of the aforesaid base material has, on opposite sides thereof, thin films 3 and 3′ of the highly insulative higher molecular weight material and the assembly is placed between electrodes 2 and 2′. The whole system is placed in a constant temperature chamber 5.

In producing the electret, the chamber 5 is maintained at a proper temperature and a D. C. potential is applied to the electrodes by a D. C. source 4 and then after cooling the chamber to room temperature, the D. C. potential is removed.

The laminated electret produced by the process of this invention has a higher stability than those electrets manufactured by using each material composing the laminated electret by itself.

The invention will be more fully explained by reference to the following examples, which are merely illustrative, and not limiting, in nature.

EXAMPLE 1

To opposite sides of a sheet having a thickness of 700 microns prepared by molding a mixture of 70 parts by weight of polyvinylidene fluoride and 30 parts by weight of polymethyl methacrylate were attached thin films of polytetrafluoroethylene, Teflon (trademane, made by Du Pont Co.) having a thickness of 10 microns and the assembly was inserted between two electrodes. A D.C. potential of 50 kv/cm was applied to the electrodes for one hour at 120° C and then, while continuing the application of the D.C. potential, the system was cooled to room temperature.

Then, the electric potential was removed and the electret thus produced was wrapped with a thin foil and stored in an air bath at 80° C during which time the variation of the surface potential was measured by means of a rotary sector-type potentiometer, the results of which are shown in FIG. 2 as curve (*a*).

In addition, the same experiment was repeated except that no Teflon films were applied to the base sheet and the variation of the surface potential is shown in FIG. 2 as curve (*b*).

In FIG. 2, the solid lines indicate the positive pole and the broken lines indicate the negative pole. The triangles represent the electret of the present invention while the circles represent the electret without the Teflon films.

EXAMPLE 2

The same procedure as in Example 1 was repeated using various materials for the electret base and for covering material as shown in the table below; the maximum surface potential and the period of time required for reducing the potential to 500 volts are also shown in the same table.

| | Electret base | | Covering material | | | |
|---|---|---|---|---|---|---|
| Number | Material | Electric resistance logpΩ-m | Material | Electric resistance logpΩ-m | Maximum surface potential (volts) | Time required for reduction (hrs.) |
| 1* | PVDF/PMMA** | 14 | None | | 1,200 | 5. |
| 2 | Same as above** | 14 | FEP Teflon | 19 | 1,500 | Over 600. |
| 3 | do** | 14 | Polystyrene | 19 | 1,500 | Over 1,000. |
| 4 | do** | 14 | PolyMMA | 16 | 1,500 | Do. |
| 5 | do** | 14 | Polyethylene terephthalate (PEJ) | 19 | 1,500 | 300. |
| 6 | do** | 14 | Polypropylene | 19 | 1,500 | 450. |
| 8 | Polyethylene (low pressure) | 17 | FEP Teflon | 19 | 3,000 | 100. |
| 7* | do | 17 | None | | 3,000 | 2. |
| 10 | Polystyrene | 17 | FEP Teflon | 19 | 1,600 | 200. |
| 9* | do | 17 | None | | 200 | 0. |
| 12 | PVDF | 14 | FEP Teflon | 19 | 1,400 | 100. |
| 11* | PVDF | 14 | None | | 2,000 | 2. |

* No. 1, 7, 9, and 11 are comparative examples.
**Compounding ratio of PVDF/PMMA is 7:3 by weight.

EXAMPLE 3

A base sheet having a thickness of 700 microns was prepared by extruding a pellet-shaped mixture of 60 parts by weight of polyvinylidene fluoride and 40 parts by weight of polymethyl methacrylate by means of a T-die extruder, and immersed in a 10 percent benzene solution of polystyrene, and after withdrawing the sheet from the solution, the solvent was evaporated away at room temperature to provide a polystyrene-coated sheet. The sheet thus obtained was sandwiched between two sheets of paper, each having a thickness of 30 microns, and then inserted between electrodes. Then, a direct current potential of 50 kv/cm was applied to the electrodes for 60 minutes at 100° C in an air bath and then the assembly was cooled to room temperature while the potential was applied thereto. After removing the electric potential, the electrodes and the papers were withdrawn and the electret sheet thus prepared was covered by an aluminum foil and stored in an air bath at 80° C. During the preservation, the change of the surface potential of the electret was measured by means of a rotary sector-type potentiometer. The variation of the surface potential of the electret with the passage of time is shown in FIG. 3 as curve (1), while the variation of the surface potential of an electret prepared in the same way as above without coating the surface of the base sheet with polystyrene is also shown in the same figure as curve (2) for comparison. From the results, it was confirmed that the stability of the surface potential of the electret represented by curve (1) was remarkably better than that of the electret represented by curve (2), which shows the excellent advantages of this invention.

EXAMPLE 4

A sheet having a thickness of 700 microns was prepared by extruding a pellet-shaped mixture of 70 parts by weight of polyvinylidene fluoride and 30 parts by weight of polymethyl methacrylate by the same manner as in Example 3 and was sandwiched between two porous sheets of paper having a thickness of 30 microns and were inserted between electrodes. A D. C. potential of 50 kv/cm was applied to the electrodes for 60 minutes at 150° C in an air bath and then, while applying the electric potential, the assembly was cooled to room temperature. After removing the potential, a number of small holes were mechanically provided to the electret base with a porosity of 5 percent and the electret base was immersed in a benzene solution of 10 percent polystyrene or a dichloroethane solution of 10 percent polycarbonate. After withdrawing the electret from the solutions, the solvent was evaporated away by allowing it to stand at room temperature to provide the polymer-coated electret sheet as shown in FIG. 4 of the accompanying drawings. The electret sheet was covered by an aluminum foil and stored in an air bath at 80° C. During storage, the change of the surface potential of the electret with the passage of time was measured by means of a rotary sector-type potentiometer, and the results are shown in FIG.5 of the accompanying drawings.

In FIG. 5, the life of the electret which was not perforated is shown as curve (1) and when the electret sheet was mechanically perforated with a hole diameter of 3mm and a hole-to-hole interval of 8mm, the life thereof was reduced as shown by curve (2). By coating the perforated electret sheet having the reduced life shown in curve (2) with the polycarbonate or polystyrene, the life of the electret was recovered as shown in curves (3) and (4), respectively, and the life in each case was further improved.

What is claimed is:

1. In a process for the production of an electret composed of a high molecular weight base material by applying to the base material a high D. C. potential at a high temperature, cooling the material while continuing the application of the potential, and then removing the electric potential, the improvement which comprises providing a stable electret by covering the opposite surfaces of the base material before polarizing the base material with thin films of a different high molecular weight material having a higher electrical insulating property than that of the base material prior to the application of the electric potential, said high molecular weight base material consisting essentially of polyvinylidene fluoride or mixture of polyvinylidene fluoride with polymethyl methacrylate wherein the weight ratio of polyvinylidene fluoride to polymethyl methacrylate in said mixture is from six-fourths to seven-thirds, and wherein said different high molecular weight material consists essentially of polytetrafluroethylene, polystyrene, polymethyl methacrylate, polyethylene terephthalate or polypropylene.

2. The process as in claim 1 wherein said base material is a mixture of polyvinylidene fluoride and polymethyl methacrylate and said different high molecular weight material is selected from the group consisting of polytetrafluoroethylene, polystyrene, polymethyl methacrylate, polyethylene terephthalate, and polypropylene.

3. The process as in claim 1 wherein the volume resistivity of said different high molecular weight material is at least $10^{15}\Omega$ –cm, and wherein the thickness of said base material varies from 50 to 3,000 microns and wherein the thickness of said different high molecular weight material coating varies from 8 to 100 microns.

4. The electret produced by the process of claim 1.

5. In a process for the production of an electret composed of a high molecular weight base material by applying to the base material a high D. C. potential at a high temperature, cooling the material while continuing the application of the potential, and then removing the electric potential, the improvement which comprises providing a stable electret by covering the opposite surfaces of the base material after polarizing the base material with thin films of a different high molecular weight material having a higher electrical insulating property than that of the base material prior th the application of the electric potential, said high molecular weight base material consisting essentially of polyvinylidene fluoride or a mixture of polyvinylidene fluoride with polymethyl methacrylate wherein the weight ratio of polyvinylidene fluoride to polymethyl methacrylate in said mixture is from six-fourths to seven-thirds, and wherein said different higher moleuclar weight material consists essentially of polytetrafluroethylene, polystyrene, polymethyl methacrylate, polyethylene terephthalate or polypropylene.

* * * * *